(12) United States Patent
Luten et al.

(10) Patent No.: US 7,261,768 B2
(45) Date of Patent: Aug. 28, 2007

(54) HYDROPHOBIC COATINGS AND METHODS

(76) Inventors: Henry A. Luten, 7851 Amrheim Dr., Ypsilanti, MI (US) 48197; John R. Bohland, 931 Schmidlin Rd., Oregon, OH (US) 43616

( * ) Notice: Subject to any disclaimer, the term of this patent is extended or adjusted under 35 U.S.C. 154(b) by 141 days.

(21) Appl. No.: 11/100,451

(22) Filed: Apr. 7, 2005

(65) Prior Publication Data

US 2006/0228566 A1 Oct. 12, 2006

(51) Int. Cl.
*C09D 183/04* (2006.01)

(52) U.S. Cl. .................. 106/287.14; 428/447; 427/387

(58) Field of Classification Search ........... 106/287.14; 428/447; 427/387
See application file for complete search history.

(56) References Cited

U.S. PATENT DOCUMENTS

| | | | | |
|---|---|---|---|---|
| 4,810,482 | A | * | 3/1989 | Iwao et al. .................. 423/347 |
| 5,071,709 | A | * | 12/1991 | Berquier et al. ............. 428/447 |
| 5,294,252 | A | * | 3/1994 | Gun ....................... 106/287.13 |
| 5,688,864 | A | * | 11/1997 | Goodwin .................... 524/858 |
| 6,511,753 | B1 | * | 1/2003 | Teranishi et al. ............ 428/447 |
| 6,713,179 | B2 | | 3/2004 | Veerasamy |
| 2004/0121491 | A1 | * | 6/2004 | Marchand-Brynaert et al. . 436/527 |
| 2006/0044500 | A1 | * | 3/2006 | Nakagawa et al. .......... 349/123 |

OTHER PUBLICATIONS

McGovern et al. "Role of Sovlent on the Silanization of Glass with Octadecyltrichlorosilane", Langmuir 1994, 10, pp. 3607-3614.*
Product data sheet, NORPAR 15 Fluid, Exxon Mobile Corp.*
Geer et al. "Off-specular x-ray scattering in Langmuir-Blodgett multilayers of a liquid-crystalline polymer", Physical Review, vol. 52, No. 1, Jul. 1995, parge 671-680.*
Roxlosnik et al. "Effect of Solvents and Concentration on the formation of a Self Assembled Monolayer of Octadecylsiloxane on Silicon", Langmuir 2003, 19, pp. 1182-1188.*
Hughes et al. "A hybrid SAM phospholipid approach to fabricating a "free" supported lipid bilayer", Phys. Chem. Chem. Phys, 2002, 4, pp. 2371-2378.*
Finklea et al. "Formation of an Organized Monolayer by Solution Adsorption of Octadecyltrichlorosilane on Gold", Langmuir 1986, 2, p. 239.*
DePalma et al. "Friction and Wear of Self-Assembled Trichlorosilane Monolayer Films on Silicon", Langmuir 1989, 5, p. 868.*
Mark E. McGovern et al; "Role of Solvent on the Silanization of Glass with Octadecyltrichlorosilane"; Langmuir 1994, 10, pp. 3607-3614.

* cited by examiner

*Primary Examiner*—Margaret G. Moore
(74) *Attorney, Agent, or Firm*—Nixon & Vanderhye, PC

(57) ABSTRACT

Liquid coating solutions impart hydrophobicity to substrate surfaces (e.g., glass) and include a silane, preferably octadecyltrichlorosilane (OTS), dissolved in a liquid paraffinic solvent. Preferred liquid paraffinic solvents are normal (straight chain) liquid parrafins having between 10 to 20 carbon atoms per molecule exhibiting flash points (ASTM D93) of between about 70° C. to about 160° C., and initial boiling points (ASTM D86) of between about 185° C. to about 300° C. The OTS will be present in the hydrophobic solutions in amounts sufficient to form a hydrophobic coating on surfaces of substrates on which the solutions are applied, and most preferably will be present in amounts ranging between about 0.25 to about 2.5 molar. Applying a coating of the solution onto a substrate surface will allow the OTS for form a self-assembled monolayer thereon imparting hydrophobicity to the substrate as determined by a high contact angle of at least about 100°.

10 Claims, 1 Drawing Sheet

HYDROPHOBIC COATINGS AND METHODS

FIELD OF THE INVENTION

Figure 1:
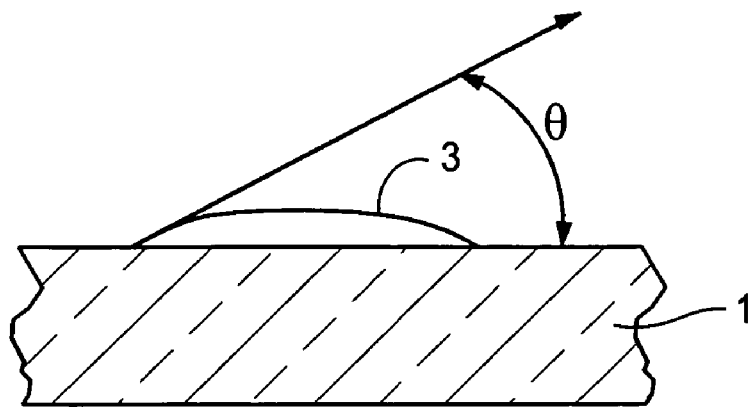

The present invention relates generally to coated substrates and methods of coating the same. In preferred embodiments, the present invention relates to transparent substrates having a hydrophobic (water repellant) coating thereon.

BACKGROUND AND SUMMARY OF THE INVENTION

Glass is typically made of silicates that are melted to form a clear, transparent, solid material. The fundamental molecular structural unit of conventional glass is a $SiO_4^{4-}$ tetrahedron. Ordinary float glass (named for its production process whereby a molten ribbon of glass is floated on molten metal to provide a smooth surface) includes additional amounts of soda ($Na_2O$), usually in the form of sodium carbonate or nitrate during the production process, lime (CaO) and other oxides (usually aluminum and magnesium oxides) to form a soda-lime-silica structure known colloquially as soda-lime glass. Other specialized glass can be prepared by the introduction of other additives and constituents.

It is sometimes highly desirable for conventional glass to have hydrophobic (water repellant) surface properties when employed in certain end-use applications, such as for automotive window glass and other articles that may be subjected to humid environments (e.g., shower stall doors, ceramic tiles and the like). Various proposals exist to impart hydrophobic (water-repellant) properties to glass substrates. For example, U.S. Pat. Nos. 4,263,350, 4,274,856, 5,665, 424 and 5,723,172 (the entire content of each being incorporated expressly hereinto by reference) disclose generally that glass surfaces can be coated with a vapor deposited layer of an chloroalkylsilane, such as dimethyidichlorosilane (DMDCS) so as to improve their hydrophobicity and/or release properties. Other proposals exist whereby a fluoro-alkylsilane (FAS) coating may be employed to "cap" an underlayer on a glass substrate so as to improve coating durability. Please see in this regard, U.S. Pat. Nos. 5,328, 768, 5,372,851, 5,380,585 and 5,580,605 (the entire content of each being incorporated expressly hereinto by reference). In addition, International Application WO 00/25938 (the entire content of which is expressly incorporated hereinto by reference) discloses that a silicon film consisting of chains of siloxane groups each terminating in an end molecule which reacts with water to form an OH group, may be capped by further reaction of that OH group with trimethylchlorosilane to form trimethylchlorosiloxane.

U.S. Pat. No. 6,743,516 to Murphy et al (the entire content of which is expressly incorporated hereinto by reference) discloses coated substrates (preferably glass) which exhibit improved hydrophobicity and durability, as well as methods of imparting such improved hydrophobicity and durability to the substrates. In some of the especially preferred embodiments disclosed therein, coated substrates and methods are provided which include a $SiO_x$-containing anchor layer comprised of a controllably humidified vapor phase deposition of a chlorosilyl group containing compound (typically silicone tetrachloride), and a hydrophobic capping layer chemically bonded to the $SiO_x$-containing anchor layer.

Published International application WO 2004/009505 (the entire content of which is expressly incorporated hereinto by reference) discloses that hydrophobic coatings may be formed on a transparent substrate by treating the surface of the substrate with a mixture or reaction product of a silicone fluid and a solvent. Most preferably the silicone fluid is an alkyl silane or a polysiloxane having a functional group capable of a condensation reaction with hydroxyl. Preferred solvents are those which are miscible with the silicone fluid, such as alcohols, ethers, esters or C1 to C40 hydrocarbons.

In commonly owned U.S. patent application Ser. No. 10/771,514 filed on Feb. 5, 2004 now U.S. Pat. No. 7,138, 186 (the entire content of which is expressly incorporated hereinto by reference), it is disclosed that certain performance enhancements can be imparted to hydrophobic coatings, such as enhanced chemical and weather resistance, by the vapor deposition of methyltrichlorosilane over a $SiO_x$-containing anchor layer on transparent substrates (e.g., glass) so as to form a film of polymethylsilsesquioxane thereon. Specifically, in accordance with such application, substrates are provided which have a hydrophobic surface coating comprised of the reaction products of methyltrichlorsilane (MTCS) and dimethyidichlorosilane (DMDCS).

Octadecyltrichlorosilane (OTS) is also known to form a self assembled monolayer (SAM) on oxide surfaced from such materials as silicon. Specifically, U.S. Pat. No. 5,071, 709 to Berquier et al (the entire content of which is expressly incorporated herein by reference) discloses the use of OTS dissolved into a mixture of aliphatic hydrocarbon and chlorinated solvents, for example dichloromethane, trichloromethane and the like, for providing an anti-icing coating on automotive windshields. The OTS coating provides for a high degree of hydrophobicity therefore preventing water sheeting and thus ice formation since discreet ice crystals are known to be much easier to remove than a continuous ice sheet. Those skilled in the art will recognize, however, that toluene and other solvents such as benzene are hazardous volatile compounds that require care to avoid environmental issues. In addition, chlorinated solvents are particularly hazardous from a human health perspective and the workspace must be carefully controlled to avoid excessive human exposure. Also, it will be appreciated that that when suing a solvent such as toluene, the solution may de-wet from the surface as the coating is forming which could lead to a lower density coating than was intended or may be required.

Therefore, while the coatings described above certainly provide hydrophobic properties, there is a continual need to improve and/or enhance the same. For example, it would be especially desirable if a more environmentally friendly solvent could be employed for OTS which wets well on glass surfaces and does not de-wet as the coating develops. It is towards providing such improvements and/or enhancements that the present invention is directed.

Broadly, the present invention is embodied in liquid coating solutions which impart hydrophobicity to substrate surfaces (e.g., glass) and include a silane dissolved in a liquid paraffinic solvent. Most preferably the silane is octadecyltrichlorosilane (OTS). Preferred liquid paraffinic solvents are normal (straight chain) liquid parrafins having between 10 to 20 carbon atoms per molecule exhibiting flash points (ASTM D93) of between about 70° C. to about 160° C., and initial boiling points (ASTM D86) of between about 185° C. to about 300° C. The OTS will be present in the hydrophobic solutions in amounts sufficient to form a hydrophobic coating on surfaces of substrates on which the solutions are applied, and most preferably will be present in amounts ranging between about 0.25 to about 2.5 molar. Applying a coating of the solution onto a substrate surface will allow the OTS for form a self-assembled monolayer thereon imparting hydrophobicity to the substrate as determined by a high contact angle of at least about 100°.

These and other aspects and advantages will become more apparent after careful consideration is given to the following detailed description of the preferred exemplary embodiments thereof.

BRIEF DESCRIPTION OF THE ACCOMPANYING DRAWINGS

Figure 2:
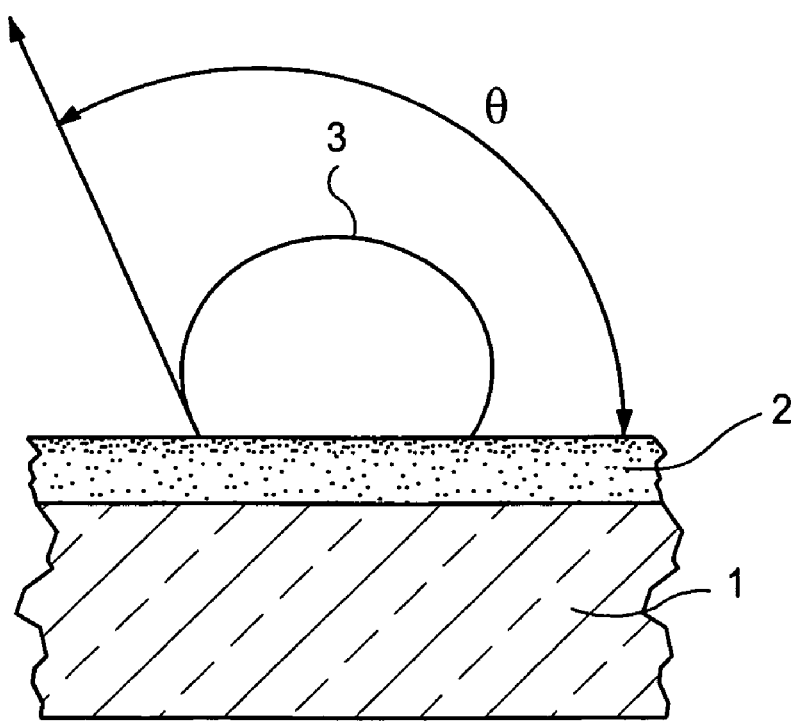

Reference will hereinafter be made to the accompanying drawings, wherein like reference numerals throughout the various FIGURES denote like structural elements, and wherein;

FIG. 1 is a schematic side cross-section view illustrating a contact angle θ of a drop (e.g., sessile drop of water) on an uncoated glass substrate; and FIG. 2 is a schematic side cross-section view illustrating a contact angle θ of a drop on a coated article including a hydrophobic coating in accordance with the present invention.

DETAILED DESCRIPTION OF THE INVENTION

Virtually any substrate that is self-supporting and has, or may be induced to have, active surface hydrogen atoms may be coated in accordance with the present invention. Thus, rigid or flexible substrates formed of glass, plastics, ceramics and the like may be coated in accordance with the present invention. Most preferably, the substrate is glass, with conventional soda-lime float glass being especially preferred.

The hydrophobic coating solutions of the present invention will necessarily include octadecyltrichlorosilane (OTS) dissolved in a liquid paraffinic solvent.

Any suitable liquid paraffinic solvent may be employed in the practice of the present invention. Preferred are normal (straight chain) liquid parrafins having between 10 to 20 carbon atoms per molecule. The preferred normal liquid paraffin solvents employed in the practice of this invention, will have greater than about 97 wt. % of n-parrafins exhibiting flash points (ASTM D93) of between about 70° C. to about 160° C., preferably between about 100° C. to about 130° C., and most preferably between about 110° C. to about 120° C. The initial boiling point (ASTM D86) of the preferred paraffinic solvents will preferably range between about 185° C. to about 300° C., more preferably between about 200° C. to about 275° C., and most preferably between about 225° C. to about 250° C. A particularly preferred liquid paraffin solvent has a minimum flash point of about 115° C. and an initial boiling point of about 240° C. Preferred liquid paraffinic solvents are commercially available from ExxonMobile Chemical Company under the trademark NORPAR™, with NORPAR™ 15 fluid being especially preferred.

The OTS will be present in the hydrophobic solutions of the present invention in amounts sufficient to form a hydrophobic coating on surfaces of substrates on which the solutions are applied. Most preferably, OTS will be present in the hydrophobic solutions of the present invention in amounts ranging between about 0.25 to about 2.5 molar, preferably between about 0.5 to about 1.5 molar, and advantageously about 1.0 molar.

The solutions of this invention are most conveniently prepared by dissolving the desired amount of OTS in the liquid paraffinic solvent. The thus formed solutions may be applied onto a substrate in need of a hydrophobic coating by any suitable means, such as spraying, dip coating, wiping and the like. For example, one preferred technique is to saturate a nonwoven or woven textile sheet with the liquid hydrophobic solution and then wipe the sheet over the substrate surface. A coating of the solution will therefore remain on the substrate surface creating a self-assembled monolayer of the OTS and rendering the surface hydrophobic.

By the term "hydrophobic" means that a liquid droplet (e.g., water) will exhibit a contact angle of at least about 100°, more preferably at least about 105° and most preferably at least about 110°. It is especially desirable for the hydrophobic coatings of the present invention to exhibit a contact angle of at least about 115°.

Exemplary contact angles θ for an uncoated glass substrate 1 and a glass substrate having a hydrophobic coating 2 in accordance with the present invention are shown in accompanying FIGS. 1 and 2, respectively. In this regard, it will be observed that the contact angle θ is the angle formed between a line tangent to the surface of a droplet 3 of liquid (e.g., water) and the plane of the surface on which the droplet is formed. The hydrophobic coating 2 creates a lesser interfacial tension with the droplet 3 thereby creating a greater contact angle θ as compared to the contact angle θ of droplet 3 on an uncoated glass surface (i.e., compare the contact angles θ of FIGS. 1 and 2).

The present invention will be further understood from the following non-limiting Example.

EXAMPLE

OTS was dissolved in a paraffinic solvent (Norpar™ 15 Fluid, ExxonMobile Chemical Company) at a concentration of 0.1 molar (0.387 g per 10 mL of solution). The solution was applied to a lab wipe on the surface of the glass substrate to be coated. The lab-wipe was saturated with the solution and allowed to remain in contact with the glass surface for a period of 10 minutes. The lab-wipe served the purpose of preventing the solution from de-wetting the glass surface so as to maintain an optimum interaction with the glass surface during coating. A self-assembled monolayer (SAM) of the OTS was formed on the glass surface.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A liquid solution which forms a hydrophobic coating when applied to a substrate surface comprising a silane dissolved in a liquid paraffinic solvent, wherein the silane comprises octadecyltrichlorosilane (OTS) which is present in an amount of between about 0.25 to about 2.5 molar.

2. The solution of claim 1, wherein the paraffinic solvent comprises n-paraffins.

3. The solution of claim 2, wherein the n-paraffins have parrafins between 10 to 20 carbon atoms per molecule.

4. The solution of claim 3, wherein the n-paraffins exhibit a flash point (ASTM D93) of between about 70° C. to about 160° C., and an initial boiling point (ASTM D86) of between about 185° C. to about 300° C.

5. The solution of claim 3, wherein the n-paraffins exhibit a minimum flash point (ASTM D93) of about 115° C. and an initial boiling point (ASTM D86) of about 240° C.

6. The solution of claim 1, wherein the OTS is present in an amount between about 0.5 to about 1.5 molar.

7. A coated substrate having a hydrophobic coating of a solution according to claim 1,2,3,4,5 or 6.

8. The coated substrate of claim 7, wherein the substrate is glass.

9. A method of coating a substrate surface comprising applying onto the surface of a substrate a solution according to claim 1,2,3,4,5 or 6.

10. The method of claim 9, wherein the solution is applied to a surface of a glass substrate.

* * * * *